(12) United States Patent
Wang et al.

(10) Patent No.: US 9,137,779 B2
(45) Date of Patent: Sep. 15, 2015

(54) DEDICATED CARRIER CONFIGURATION METHOD AND DEVICE AND MULTIMEDIA BROADCAST MULTICAST SERVICE TRANSMISSION METHOD

(75) Inventors: Xuelong Wang, Beijing (CN); Yu Ding, Beijing (CN); Lei Mao, Beijing (CN); Shiyan Ren, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 1313 days.

(21) Appl. No.: 12/598,130

(22) PCT Filed: Apr. 24, 2008

(86) PCT No.: PCT/CN2008/070796
§ 371 (c)(1),
(2), (4) Date: Jul. 21, 2010

(87) PCT Pub. No.: WO2008/134964
PCT Pub. Date: Nov. 13, 2008

(65) Prior Publication Data
US 2010/0284319 A1    Nov. 11, 2010

(30) Foreign Application Priority Data

Apr. 29, 2007   (CN) .......................... 2007 1 0098923

(51) Int. Cl.
*H04W 72/00*   (2009.01)
*H04W 40/00*   (2009.01)
*H04J 3/00*    (2006.01)
*H04B 7/08*    (2006.01)

(52) U.S. Cl.
CPC ............ *H04W 72/005* (2013.01); *H04W 40/00* (2013.01); *H04B 7/08* (2013.01); *H04J 3/00* (2013.01); *Y02B 60/50* (2013.01)

(58) Field of Classification Search
None
See application file for complete search history.

(56) References Cited

U.S. PATENT DOCUMENTS

| | | | | |
|---|---|---|---|---|
| 2003/0207696 | A1* | 11/2003 | Willenegger et al. | 455/522 |
| 2003/0223394 | A1* | 12/2003 | Parantainen et al. | 370/336 |
| 2005/0249141 | A1* | 11/2005 | Lee et al. | 370/312 |
| 2006/0034205 | A1* | 2/2006 | Kim | 370/312 |
| 2006/0126590 | A1* | 6/2006 | Putcha et al. | 370/343 |
| 2008/0311892 | A1* | 12/2008 | Lee et al. | 455/414.1 |

OTHER PUBLICATIONS

3GPP TR 25.905 V2.1.0 "Improvement of the Multimedia Broadcast Multicast Service (MBMS) in UTRAN (Release 7)", pp. 13, 38, published Dec. 31, 2006.

* cited by examiner

Primary Examiner — Kodzovi Acolatse
(74) Attorney, Agent, or Firm — Hoffmann & Baron, LLP

(57) ABSTRACT

The present invention discloses a MBMS dedicated carrier configuration method, including: at least one of MBMS dedicated carriers in a cell is chose and assigned MBMS control information of all MBMS dedicated carriers and MBMS system information; and frequency information and scrambling code group ID information of at least one MBMS dedicated carriers assigned bundling information is assigned to conventional service carriers in the cell. The present invention also discloses a device for realizing said method and a MBMS transmission method based on dedicated carriers assigned the bundling information. The present invention realizes MBMS bundling on the dedicated carriers, and UE can receive services by directly sensing the carriers bearing control signaling, and thus it can reduce meaningless switching sense by the UE and save power.

17 Claims, 4 Drawing Sheets

DEDICATED CARRIER CONFIGURATION METHOD AND DEVICE AND MULTIMEDIA BROADCAST MULTICAST SERVICE TRANSMISSION METHOD

TECHNICAL FIELD

The present invention relates to a technology for transmitting Multimedia Broadcast Multicast Service (MBMS) by mobile communication systems, more specifically, to a MBMS dedicated carrier configuration method and device and a MBMS transmission method for dedicated carriers assigned bundling information based on said configuration method.

BACKGROUND ART

To effectively utilize mobile communication network resources, the third generation mobile communication global standardization organization (3GPP) Release6 brings forward the MBMS of mobile communication networks, and thus a point-to-multipoint service of sending data from one data source to multiple users is provided in mobile communication networks, which can share network resource, improve the utilization of network resources, especially can share air interface resource.

FIG. 1 is a schematic view of the architecture of the radio network which supports broadcast multicast services. As shown in FIG. 1, in current 3GPP, the architecture of the radio network which supports broadcast multicast services comprises a broadcast multicast service server (BM-SC) 101 which is connected with a Gateway GPRS Support Node (GGSN) 102 via an interface Gmb or an interface Gi, wherein one BM-SC 101 can be connected with multiple GGSNs 102; the GGSN 102 is connected with a Serving GPRS Support Node (SGSN) 103 via an interface Gn/Gp, wherein one GGSN 102 can be connected with multiple SGSNs 103; the SGSN 103 is connected with a Universal Mobile Telecommunication System (UMTS) Terrestrial Radio Access Network (UTRAN) 104 via an interface Iu, and then the UTRAN 104 is connected with a user equipment (UE) 106 via an interface Uu, and the SGSN 103 can also be connected with a Global System for Mobile Communication System (GSM) Enhancement Radio Access Network (GERAN) 105 via interface Iu/Gb, and then it can be connected with a UE 107 via an interface Um. Wherein, the GGSN and the SGSN are nodes in the core network (CN) of radio networks.

It can be seen from the network architecture shown in FIG. 1 that in order to support the MBMS service, a mobile network functional entity, in particular a broadcast multicast service center, i.e. BM-SC, is added into the third generation mobile communication systems, the BM-SC is an entrance for content providers, which is used for authorizing and initiating a MBMS service and transmitting the MBMS content according to a predetermined time plan. In addition, MBMS-related functions are added into functional entities such as UE, UTRAN, GERAN, SGSN and GGSN.

The MBMS put forward in 3GPP can realize not only multicast and broadcast of message in plaintext at low rate, but also multicast and broadcast of multimedia services at high rate, which doubtlessly conforms to the development trend of mobile data in future. In order to further improve the transmission rate of the MBMS data, a solution of adopting dedicated independent carriers to bear the MBMS is currently put forward in 3GPP for Frequency Division Duplex (FDD) and 3.84 Mcps Time Division Duplex (TDD), that is, a frequency layer dedicated for transmitting the MBMS is individually established in the coverage area of current universal mobile communication systems, and the UE has the ability of receiving the MBMS transmitted through conventional carriers and dedicated carriers.

In 3GPP Release7 TR 25.905, a MBMS dedicated carrier mechanism suitable for WCDMA and HCR TDD systems is detailed, and the dedicated carrier can be the downlink carrier of WCDMA or HCR TDD carrier (all being downlink). To identify whether a carrier is a dedicated one, a system information block SIB3 in system information is proposed to be used for transmitting a MBSFN mark indicating whether the carrier is a dedicated carrier or not. If a carrier is dedicated for transmitting MBMS data services in a SFN mode, its specific information, such as the configuration of MBMS point-to-multipoint Control Channel (MCCH) and configuration of the scrambling code of MBMS point-to-multipoint Traffic Channel (MTCH), is carried in the system information block SIB5. Information carried in SIB3 and SIB5 substantially includes resources configuration states for MBMS data services transmission. The above solution also requires transmitting a dedicated carrier frequency list and an inter-Freq and intra-Freq measurement cell information list by SIB11. Except SIB3, SIB5 and SIB11, SIB information blocks currently transmitted in other conventional cells are not transmitted on MBMS dedicated carriers.

To simplify the MCCH signaling for the dedicated carriers, the dedicated carrier will not be directly used for uplink transmission, and MBMS access information will not be carried in the system information. Due to the MBMS signal transmitted for the dedicated carriers, when receiving data signals, the UE needs to take MBSFN multi-path signals in neighboring cells as conventional multi-path signals and perform physical layer-related process to it, and thus there is no need for the MCCH to transmit the RB information of neighboring cells for multi-path combining, i.e. MBMS neighboring cell P-T-M RB information.

Currently 3GPP does not propose a method for transmitting the MBMS at MBMS dedicated carriers in TDD systems.

SUMMARY OF THE INVENTION

In view of this, the present invention mainly aims to provide a MBMS dedicated carrier configuration method and device, wherein all configured MBMS dedicated carriers in a cell are bundled by the configuration of MBMS dedicated carriers, which can make it convenient for a UE to sense all MBMS services carried in the MBMS dedicated carrier in the cell.

Another object of the present invention is to provide a MBMS transmission method based on dedicated carriers assigned bundling information, which transmit MBMS services by using said dedicated carriers assigned bundling information, and thus lowers the sense switching frequency of the UE, and the UE complexity is not high.

To realize the above objects, the technical solution of the present invention is realized as follows:

A multimedia broadcast multicast service MBMS dedicated carrier configuration method includes:
dedicated carrier bundling information is assigned to the downlink timeslot of at least one MBMS dedicated carrier frame (also called "the downlink timeslot of the radio frame of at least one MBMS dedicated carrier") in a cell.

Wherein, the dedicated carrier bundling information includes: MBMS control information of all dedicated carriers and MBMS system information.

Wherein, the MBMS control information of all dedicated carriers and the MBMS system information are assigned to one downlink timeslot of the MBMS dedicated carrier frame.

Wherein, the downlink timeslot, assigned the MBMS control information of all dedicated carriers and the MBMS system information, is used for a MBMS broadcast control channel BCCH and a MBMS point-to-multipoint control channel MCCH, and the MBMS system information is carried on the BCCH and mapped to a primary common control physical channel PCCPCH via a broadcast channel BCH; the MBMS control information is carried on the MCCH and mapped to a secondary common control physical channel SCCPCH via a forward access channel FACH.

Wherein, the PCCPCH is located at a fixed position of the downlink timeslot, and the fixed position information is set to respective MBMS mobile terminals.

Wherein, the downlink timeslot, assigned the MBMS control information of all dedicated carriers and the MBMS system information, is assigned MBMS service notice information or program guidance information, which is mapped to the secondary common control physical channel SCCPCH via a MBMS point-to-multipoint service channel MTCH.

Wherein, the downlink timeslot, assigned the MBMS control information of all dedicated carriers and the MBMS system information, is used for one or more of a MBMS point-to-multipoint scheduling channel MSCH, a MBMS notification indicator channel MICH, a MBMS point-to-multipoint service channel MTCH and a conventional service paging channel.

Said method further includes:

The frequency information and the scrambling code group ID information of the MBMS dedicated carriers is assigned to conventional service carriers in the cell, wherein at least one of the MBMS dedicated carrier is assigned the MBMS system information and the MBMS control information of all dedicated carriers.

Wherein, the MBMS system information is carried in system information blocks SIB. The system information blocks carrying the MBMS system information include at least a SIB5 and a master information block.

Wherein, the MBMS control information includes MBMS modified services information, MBMS unmodified services information, MBMS general information, MBMS common point-to-multipoint radio bearer information, MBMS current cell point-to-multipoint radio bearer information, and MBMS neighboring cell point-to-multipoint radio bearer information.

A MBMS dedicated carrier configuration device includes:
a bundling information configuration unit is used for assigning MBMS control information of all MBMS dedicated carriers and MBMS system information to at least one MBMS dedicated carrier in a cell; and
a bundling carrier information configuration unit is used for assigning the frequency information and the scrambling code group ID information of at least one MBMS dedicated carriers, assigned the MBMS control information of all MBMS dedicated carriers and the MBMS system information, to conventional service carriers in the cell.

Wherein the MBMS control information of all dedicated carriers and the MBMS system information are assigned to one downlink timeslot of a MBMS dedicated carrier frame.

Wherein, the downlink timeslot, assigned the MBMS control information of all dedicated carriers and the MBMS system information, is used for a MBMS broadcast control channel BCCH and a MBMS point-to-multipoint control channel MCCH, and the MBMS system information is carried on the BCCH and mapped to a primary common control physical channel PCCPCH via a broadcast channel BCH; the MBMS control information is carried on the MCCH and mapped to a secondary common control physical channel SCCPCH via a forward access channel FACH.

Wherein, the PCCPCH is located at a fixed position of the downlink timeslot, and the fixed position information is set in respective MBMS mobile terminals.

Wherein, the MBMS system information is carried in the system information blocks SIB.

Wherein, the MBMS control information includes MBMS modified services information, MBMS unmodified services information, MBMS general information, MBMS common point-to-multipoint radio bearer information, MBMS current cell point-to-multipoint radio bearer information, and MBMS neighboring cell point-to-multipoint radio bearer information.

A MBMS transmission method based on dedicated carriers assigned bundling information includes:
MBMS control information of all MBMS dedicated carriers and MBMS system information is assigned to at least one MBMS dedicated carrier;
The frequency information and the scrambling code group ID information of the MBMS dedicated carriers, at least one of which is assigned the MBMS control information of all dedicated carriers and the MBMS system information, is assigned to conventional service carriers in the cell; and
MBMS data is sent.

The above method further includes:
a UE is synchronized to the conventional service carriers and acquires the frequency information and the scrambling code group ID information of the MBMS dedicated carriers, which is assigned the MBMS system information and control information, and UE is synchronized to a dedicated carrier according to the time synchronization information of the conventional service carriers, the frequency information and the scrambling code group ID information of the MBMS dedicated carriers, and senses the MBMS control information of all the MBMS dedicated carriers and the MBMS system information to obtain the configuration information of the MBMS services, and receives the MBMS data on the dedicated carrier.

Wherein, the UE senses the carriers in a discontinuous reception DRX manner.

By configuring MBMS dedicated carriers, the MBMS dedicated carrier configuration method and device according to the present invention make at least one MBMS dedicated carrier in each cell carry the service information of all MBMS dedicated carriers in the cell, that is, the MBMS dedicated carriers in the cell are bundled, and in this way, the UE can receive the MBMS services transmitted on all MBMS dedicated carriers in the cell as long as it senses the MBMS dedicated carriers assigned the bundling information. If needed, the bundling information also can be assigned to one MBMS dedicated carrier in the cell, and the bundling information can be assigned to multiple or all of the MBMS dedicated carriers. In the case that all the MBMS dedicated carriers in the cell are assigned the bundling information, the UE can select any MBMS dedicated carrier for sensing. Said bundling information is only assigned to one downlink timeslot of the MBMS dedicated carriers, and all the other downlink timeslots can be used to transmit the MBMS services, which greatly improves the transmission rate of the MBMS service. Of course, idle resource can also be used to transmit the MBMS services if it still existed in the timeslot assigned the bundling information.

The present invention provides MBMS services for a terminal user within radio coverage area in a manner of combining conventional service carriers with MBMS dedicated carriers, wherein the carrier information and the scrambling code group ID information of the MBMS dedicated carriers are assigned to and sent in the conventional service carriers, and such information is broadcast within the cell via the system broadcast message of the conventional service carriers, and the UE gets the synchronization channel of the conventional service carriers after it turns on, and is then directly synchronized to the dedicated carrier assigned the bundling information according to a predetermined time sequence relationship after receiving the carrier information and the scrambling code group ID information of the MBMS dedicated carriers, and thereby senses the configuration information of the MBMS services, so that the UE is used to receive the MBMS services. The UE in the present invention does not need to sense the conventional service carriers and the MBMS dedicated carriers all the time, and can sense the MBMS services in the discontinuous reception manner, which can make low design complexity and low power consumption of the UE.

BRIEF DESCRIPTION OF THE ACCOMPANYING DRAWINGS

DETAILED DESCRIPTION OF THE INVENTION

The core idea of the present invention lies in that provide MBMS services to terminal users within a radio coverage area in a manner of combining conventional service carriers with a MBMS dedicated carrier, wherein carrier information and scrambling code group ID information of the MBMS dedicated carriers are assigned to and sent on the conventional service carrier, and MBMS control information of the dedicated carrier and MBMS system information are carried on the MBMS dedicated carrier. Especially, if there are multiple MBMS dedicated carriers, MBMS dedicated carrier frames in a TDD system are suitably configured so that all MBMS dedicated carriers in a cell are bundled to transmit MBMS services, therefore there is no need for UE to often switch between the dedicated carriers during sensing the MBMS dedicated carriers. The technical solution of the present invention will be detailed hereinafter in conjunction with the drawings thereof.

Figure 1:
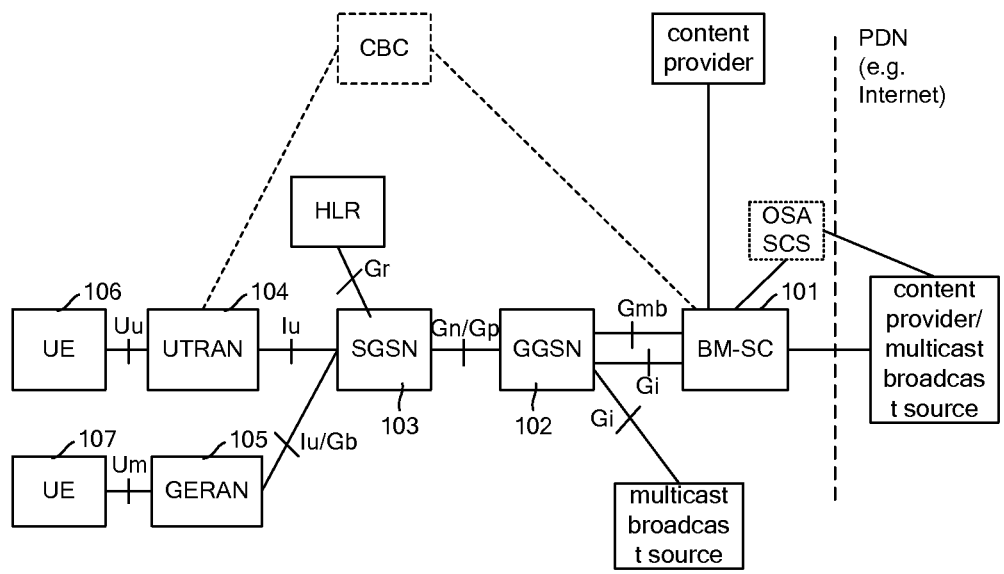
FIG. 1 illustrates an architecture of a radio network supporting broadcast multicast services.
Figure 2:
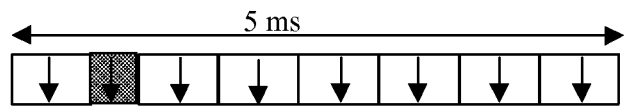
FIG. 2 illustrates a structure of a MBMS dedicated carrier frame provided for a TDD system.
Figure 3:
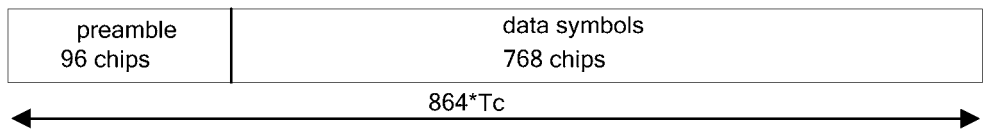
FIG. 3 illustrates a structure of a MBMS service timeslot in the frame structure shown in FIG. 2.
Figure 4:
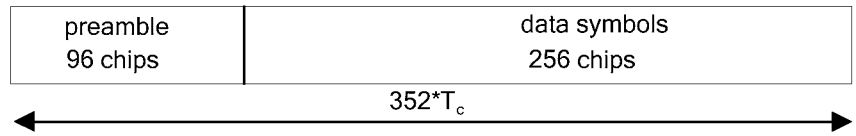
FIG. 4 illustrates a structure of a MBMS short timeslot in the frame structure shown in FIG. 2.

FIG. 2 illustrates a structure of a MBMS dedicated carrier frame provided for TDD systems. As shown in FIG. 2, the MBMS service frame structure has some difference from the TDD conventional service frame structure, a 96 chip downlink pilot timeslot DwPTS, a 96 chip uplink pilot timeslot UpPTS and a 96 chip guard period GP between the downlink and the uplink in traditional frame structures do not exist, and they are combined as a short timeslot, which is shown as the shadow part in FIG. 2. The length of the short timeslot is 0.275 ms, which is mainly used for control information transmission. The frame structure of 1.28 Mcps includes 8 timeslots, wherein 7 timeslots are service timeslots, and all timeslots are used for downlink transmission and omnidirection transmit. FIG. 3 illustrates a structure of the MBMS service timeslot in the frame structure shown in FIG. 2. As shown in FIG. 3, the channel estimation code of the service timeslot is of 96 chips, which is followed by data symbols of 768 chips, wherein Tc=675 ms, being the reciprocal of chip rate. FIG. 4 illustrates a structure of a MBMS short timeslot in the frame structure shown in FIG. 2. As shown in FIG. 4, the channel estimation code of the short timeslot is also of 96 chips, which is followed by data symbols of 256 chips, wherein Tc=275 ms.

A configuration device and method for a MBMS service frame according to the present invention will be detailed hereinafter.

Figure 5:
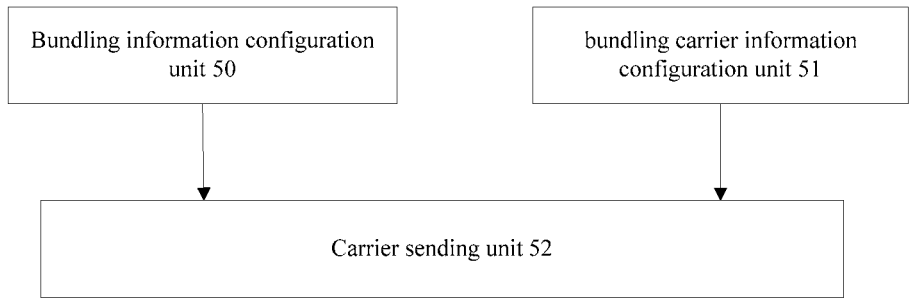
FIG. 5 illustrates a structure of a configuration device of the MBMS dedicated carrier frame according to an embodiment of the present invention.

FIG. 5 illustrates a structure of the configuration device of the MBMS dedicated carrier frame according to the embodiment of the present invention. As shown in FIG. 5, the configuration device of the MBMS dedicated carrier frame according to the embodiment of the present invention includes a bundling information configuration unit 50, a bundling carrier information configuration unit 51 and a carrier sending unit 52, wherein the bundling information configuration unit 50 is used for selecting at least one MBMS dedicated carrier in a cell and assigning MBMS control information of all the MBMS dedicated carriers and MBMS system information to it; the bundling carrier information configuration unit 51 is used for assigning the frequency information and the scrambling code group ID information of at least one MBMS dedicated carriers configured by the bundling information configuration unit 50 to the conventional service carriers in the cell. The carrier sending unit 52 is used for transmitting the dedicated carriers and conventional service carriers configured by the bundling information configuration unit 50 and the bundling carrier information configuration unit 51.

In the embodiment of the present invention, each cell is configured with multiple carriers, that is, one conventional service carrier and at least one MBMS dedicated carrier. In view of the available resources of the system, generally each cell is configured with 2 to 3 dedicated carriers. The bundling information configuration unit 50 assigns bundling information to at least one MBMS dedicated carrier in the cell. Wherein, assigning the bundling information to the MBMS dedicated carriers in the embodiment of the present invention is that the bundling information, such as the MBMS control information of all the MBMS dedicated carriers and the MBMS system information, are assigned to one MBMS dedicated carrier in the cell. As shown in FIG. 2, in the present invention, the above bundling information is assigned to a short timeslot of the MBMS dedicated carrier frame, and specifically the short timeslot is mainly used for a Broadcast Control Channel (BCCH) and a MCCH. The short timeslot adopts 16 code division channels in which the spreading factor SF is 16. The BCCH on the short timeslot is mapped to a Primary Common Control Physical Channel (PCCPCH) via a transmission channel broadcast channel (BCH), wherein the PCCPCH physical channel is located at a fix position of the code division channel of the short timeslot, for example, the first channel in which SF=16, and the position will not be changed if it is determined. All the PCCPCH physical channels in the system are all located at fixed positions in the frame and of fixed coding and modulating manners. The information of said fixed positions and coding and modulating manners are set to respective MBMS mobile terminals as parameters, so that the UE can decode this channel. The PCCPCH physical channel can also be located at the other code channels of the 16 code channels. If it is determined, the PCCPCH are located on the same positions of all the MBMS service frames in the system. The MCCH channel in the short timeslot is mapped to a Secondary Common Control Physical Channel (SCCPCH) via a Forward Access Channel (FACH) transmission channel.

The short timeslot is also used for a MBMS notification Indicator Channel (MICH) or a MBMS point-to-multipoint Scheduling Channel (MSCH), so that the terminal can receive MBMS in DRX manner. According to the requirement of the system, conventional service paging channels can also be configured: Paging Indicator Channel (PICH) and Paging Channel (PCH), so that users are notified of conventional services through the dedicated carriers when the users are receiving the MBMS services.

If the above PCCPCH and the SCCPCH have not taken up all the code division channels, the remaining channel resources of the short timeslot can be used for the MTCH channel. In the embodiment of the present invention, the PCCPCH physical channel in the short timeslot is mainly used to carry system information and will not be used for a beacon channel. The service timeslot of the MBMS service frame is used for a MTCH channel, and it is mapped to the SCCPCH physical channel via the FACH transmission channel. All service timeslots are used to transmit the MBMS service.

Before transmitting the MBMS service, generally the BM-SC needs to notify UE the service, and in a traditional 3GPP Release6 system, the notification is generally carried in packet data protocol context. In the MBMS dedicated carrier system, according to the embodiment of the present invention, such kind of MBMS service notification or program guidance information can be assigned to the short timeslot. Due to downlink features of the short timeslot, such information can be broadcast in respective SFN cells at RNC level. Said MBMS service notification or program guidance information is mapped to the secondary common control physical channel SCCPCH via the MBMS point-to-multipoint service channel MTCH.

It is noted that in one cell, the above bundling information can be assigned to one MBMS dedicated carrier or two (if there are two or more) MBMS dedicated carriers. When there are multiple MBMS dedicated carriers, they all can be assigned the bundling information.

One skilled in the art should understand that the structure of the MBMS dedicated carrier frame is considered as illustrative explanation. In the embodiment of the present invention, the bundling information can be assigned to other downlink timeslots.

The case that single frequency network SFN technology is adopted in the MBMS dedicated carrier system is called a MBSFN mode. In traditional MBSFN technology, the service channels in the cells for the SFN transmission occupy the same frequency and the same resource, i.e. occupying same frequencies, using same channels or timeslots, and being assigned same scrambling code resource. In the embodiment of the present invention, when the MBMS dedicated carrier system adopts MBSFN technology, the service channel and the control channel both adopt the SFN mode to transmit. That is to say, when several cells in the MBMS dedicated carrier system need to adopt the SFN for transmission, the channels for transmitting the MBMS service in the dedicated carrier cells should adopt the same scrambling code, and all short timeslots in these dedicated carrier cells must also adopt the same scrambling code.

In the embodiment of the present invention, relevant information of the above dedicated carriers assigned the bundling information need further be assigned to the conventional service carriers, so that it is convenient for the UE to sense the relevant information of the dedicated carriers assigned the bundling information. In the embodiment of the present invention, the bundling carrier information configuration unit 51 is used to configure the conventional service carriers.

The UE supporting a conventional service carrier network and a MBMS dedicated carrier network should support double receivers. Since the MBMS dedicated carriers in the embodiment of the present invention has no synchronization channel, the UE only can be synchronized to the MBMS dedicated carriers after being synchronized to the conventional service carriers. This requires the associated cells in the conventional service carrier network to insert the frequency information of the MBMS dedicated carrier network cells associated with them and corresponding MBSFN cell parameter ID into their system information to broadcast. The MBSFN cell parameter ID is the scrambling code group ID assigned to the short timeslots in the MBMS dedicated carrier network cells. After being synchronized in the conventional service carrier network, the UE receives the frequency information of the dedicated carriers and the MBSFN cell parameter ID from the conventional service carriers, and searches the signal of the MBMS dedicated carriers and then is synchronized with it.

The MBMS dedicated carrier network will not configure a beacon channel and the UE supporting the conventional carrier network and the MBMS dedicated carrier network only resides in the cells of the conventional carrier network. The cells in the MBMS dedicated carrier network do not serve as the object for residing, selecting and reselecting. All operations on the MBMS dedicated carriers by the UE can be deemed to occur in an idle mode and there is no Radio Resource Control (RRC) connection with the network.

Since in the cells of the MBMS dedicated carrier network in the embodiment of the present invention can transmit the MBMS services born by other MBMS dedicated carriers and the corresponding radio bearer (RB) configuration information, the UE can know the situation of the services transmitted by other dedicated carriers by only sensing one dedicated carrier without switching the carriers, and the UE can obtain the transmission situation of the services on said other MBMS dedicated carriers and the configuration of the associated RB by reading control signaling in the current MBMS dedicated carrier. The services associated with the UE can be received by switching directly to the service channels on other dedicated carriers, there is no need for the UE to switch to the MCCH control channels on other carriers and then receive the services by reading the RB configuration of relevant services, which could save the switch time of the UE.

When multiple MBMS dedicated carriers in the cell are assigned the bundling information, the UE selects one such MBMS dedicated carrier for sensing.

MBMS-related channels and the mapping relationship therebetween will be briefly introduced hereinafter, so as to better understand the transmission of the MBMS data services in the embodiment of the present invention.

The MBMS mainly relates to MICH, MCCH, MTCH and MSCH, wherein, MICH is a physical channel similar to the paging channel PICH, and MCCH, MTCH and MSCH are three logic channels.

The MCCH is used for transmitting point-to-multipoint (P-T-M) control plane information in downlink between the network and the user equipment UE under the radio resource control (RRC) connection mode or idle mode. Generally, the MCCH is mapped to a specific forward access channel (FACH) of the secondary common control physical channel SCCPCH, which is marked on the broadcast control channel BCCH.

The MTCH is used for transmitting point-to-multipoint MBMS service information of user plane in downlink between the network and multiple user equipments UE under the RRC connection mode or idle mode, and the MTCH is always mapped to a specific FACH of the SCCPCH, which is marked on the MCCH.

The MSCH is used for transmitting point-to-multipoint MBMS service transmission scheduling information in downlink between the network and multiple user equipments UE under the RRC connection mode or idle mode, and the MSCH is always mapped to a specific FACH of the SCCPCH, which is marked on the MCCH.

In the embodiment of the present invention, the system information in the MBMS dedicated carrier network cell is mainly carried on a Master Information Block, a SIB3, a SIB5 and a SIB11. The information carried on the Master Information Block is the same as that carried on the master information blocks in 3GPP Release6, please refer to the relevant description in protocol TS25.331. Parameters carried in traditional SIB3 are mainly used for cell selection and reselection, while the MBMS dedicated carrier network cells do not participate in these processes, thus many parameters may not be transmitted. In the embodiment of the present invention, the SIB3 is mainly used to transmit a cell ID, cell access restriction parameters and a MBSFN only indication. The specific contents of the SIB3 are shown in table 1:

TABLE 1

| Information Element/Group name | Need | Multi | Type and reference | Semantics description | Version |
|---|---|---|---|---|---|
| Cell identity | MP | | Cell identity 10.3.2.2 | | |
| Cell Access Restriction | MP | | Cell Access Restriction 10.3.2.1 | | |
| MBSFN only service | OP | | Enumerated (true) | Indicates if the cell provides only MBSFN | REL-7 |

The SIB5 in the MBMS dedicated carrier network cells is used to transmit the configuration information of the SCCPCH on the short timeslots, a frequency band indication and TDD MBSFN information. Please refer to relevant description in TS25.331 for the specific IE of the SIB5. The configuration information of PCCPCH need not to be transmitted on the SIB5, as the PCCPCH is mainly used for indicating diversity information and cell code group information, while the MBMS dedicated carrier network cells do not adopt TSTD and SCTD diversities, and their cell code group information is transmitted on their associated conventional carriers. The specific contents of the SIB5 are shown in table 2:

TABLE 2

| Information Element/Group name | Need | Multi | Type and reference | Semantics description | Version |
|---|---|---|---|---|---|
| Frequency band indicator | OP | | Frequency band indicator 10.3.6.35b | | REL-6 |
| Frequency band indicator 2 | OP | | Frequency band indicator 2 10.3.6.35c | | REL-6 |
| Secondary CCPCH system information MBMS | OP | | Secondary CCPCH system information MBMS 10.3.6.72a | Included if MCCH is on an S-CCPCH used only for MBMS. | REL-6 |
| TDD MBSFN information | OP | | TDD MBSFN Information 10.3.6.78b | TDD only: included only if all timeslots are designated to MBSFN. | REL-7 |

Main parameter information of the TDD MBSFN is shown in table 3:

TABLE 3

| Information Element/Group name | Need | Multi | Type and reference | Semantics description | Version |
|---|---|---|---|---|---|
| Time slot list | MP | 1 ... <maxTS> | | | REL-7 |
| >Timeslot Number | MP | | Timeslot Number 10.3.6.84 | | REL-7 |

TABLE 3-continued

| Information Element/Group name | Need | Multi | Type and reference | Semantics description | Version |
|---|---|---|---|---|---|
| >*MBSFN Cell parameter ID* | MP | | *Only for 1.28 Mcps TDD. MBSFN Cell parameter Id 10.3.9a.y See Note 1* | | REL-7 |

The italics in the table refer to newly amended contents with respect to the embodiment of the present invention.

The SIB11 in the MBMS dedicated carrier network cells is used for transmitting measurement control information in the short timeslots and a MBSFN frequency list. The information format of the SIB11 is shown in table 4:

TABLE 4

| Information Element/Group name | Need | Multi | Type and reference | Semantics description | Version |
|---|---|---|---|---|---|
| Measurement control system information | MP | | Measurement control system information 10.3.7.47 | | |
| MBSFN frequency list | OP | | MBSFN frequency list list | If present contains all neighbouring frequencies providing MBMS service in MBSFN mode | Rel-7 |

Wherein, the main parameters included by the MBSFN frequency list in table 4 are shown in table 5:

TABLE 5

| Information Element/Group name | Need | Multi | Type and reference | Semantics description |
|---|---|---|---|---|
| MBSFN TDD frequency list | MP | <0 ... 12> | | |
| >UARFCN (Nt) | MP | | Integer(0 ... 16383) | |
| >*MBSFN Cell parameter ID* | MP | | *Only for 1.28 Mcps TDD. MBSFN Cell parameter Id 10.3.9a.y See Note 1* | |

The italics in the table refer to newly amended content with respect to the embodiment of the present invention.

In the embodiment of the present invention, the system information included in the master information block and the SIB5 is the content that must be transmitted, while the SIB3 and SIB11 may select whether need transmit the information according to different service demands.

MBMS control signaling transmitted on the MCCH includes: MBMS MODIFIED SERVICES INFORMATION, MBMS UNMODIFIED SERVICES INFORMATION, MBMS GENERAL INFORMATION, MBMS COMMON P-T-M RB INFORMATION, MBMS CURRENT CELL P-T-M RB INFORMATION, and MBMS NEIGHBOURING CELL P-T-M RB INFORMATION. The above MBMS control signaling will be briefly introduced hereinafter.

The MBMS MODIFIED SERVICES INFORMATION is mainly used for indicating MBMS service amendment and can be used for DRX and notification. The content of the message transmitted by the MBMS dedicated carrier system in the embodiment of the present invention is simpler than the content of the corresponding message in 3GPP Release6, and the main reason is that the dedicated carrier cell do not support the carriers selected, but the MBMS dedicated carrier system proposed in the present invention supports carrier association by adopting a specific technology. In addition, since all MBMS carriers in the MBMS dedicated carrier system are used for downlink transmission, the UE can not be required to uplink feedback, and thus associated cells need not be transmitted. However, during specific transmission, the MBMS control signaling should include not only the service changes of current cell but also the service activation of MBMS dedicated carrier cells on neighboring frequencies. When the system conducts carrier association, it is required to number the frequencies of all associated MBMS dedicated carrier cells, and thus indicating specific service changes should also carry the neighbor frequency information, which is directed to the frequency information list transmitted in the SIB11. The specific information format is shown in table 6:

TABLE 6

| Information Element/Group name | Need | Multi | Type and reference | Semantics description | Version |
|---|---|---|---|---|---|
| Message type | MP | | Message Type | | REL-6 |
| Modified service list | OP | 1 ... <maxMBMS servModif> | | | REL-6 |
| >MBMS Transmission identity | MP | | MBMS Transmission identity 10.3.9a.12 | | REL-6 |

TABLE 6-continued

| Information Element/Group name | Need | Multi | Type and reference | Semantics description | Version |
|---|---|---|---|---|---|
| >MBSFN inter frequency neighbour | OP | | Integer(1 ... <maxMBMS-Freq>) | Absence of this information element means the currently used frequency. Value n corresponds with the $n^{th}$ frequency included in the IE New inter-frequency cells that is specified within SIB 11 | REL-7 |
| >Continue MCCH reading | MP | | BOOLEAN | MCCH in-band notification. Indicates whether or not the UE should continue reading MCCH in the next modification period. Not applicable when sent on the DCCH | REL-6 |
| MBMS re-acquire MCCH | CV-MCCHOP | | Enumerated (True) | | REL-6 |
| End of modified MCCH information | OP | | Integer (1 ... 16) | If present: the UE may assume that, in each repetition period, all the MCCH information preceding the MBMS UNMODIFIED SERVICES INFORMATION message is transmitted within the indicated number of TTIs. | REL-6 |
| MBMS all unmodified p-t-m services | CV-*MCCHOP* | | Enumerated (True) | True means that the UE should re-acquire the PtM information for all services listed in the message MBMS UNMODIFIED SERVICES INFORMATION with the IE "MBMS required UE action" set to "Acquire PTM RB info" | REL-6 |
| MBMS p-t-m activation time | CV-*MCCHOP* | | MBMS p-t-m activation time 10.3.9a.7o | | REL-6 |

The italics in the table refer to newly amended contents with respect to the embodiment of the present invention.

The MBMS UNMODIFIED SERVICES INFORMATION is mainly used for indicating unmodified MBMS services. The content of the message transmitted by the MBMS dedicated carrier system in the embodiment of the present invention is simpler than the content of the corresponding message in 3GPP Release6, and the main reason is that the dedicated carrier cells do not support carriers selected, but the MBMS dedicated carrier system proposed in the present invention supports carrier association by adopting a specific technology. In addition, since all MBMS carriers in the MBMS dedicated carrier system are used for downlink transmission, the UE can not be required to uplink feedback, and thus associated cells need not be transmitted. However, during transmission, the MBMS control signaling should include not only the unmodified MBMS services of the current cell, but also the unmodified MBMS services of MBMS dedicated carrier cells on neighbor frequencies. The specific information format is shown in table 7:

TABLE 7

| Information Element/Group name | Need | Multi | Type and reference | Semantics description | Version |
|---|---|---|---|---|---|
| Message type | MP | | Message Type | | REL-6 |
| Unmodified services list | OP | 1 to <maxMBMS servUnmodif> | | If the IE "MBMS all unmodified p-t-m services" is included in the MBMS MODIFIED SERVICES INFORMATION message in this modification period, the services with the IE "MBMS required UE action" set to "Acquire PTM RB info" in the message MBMS UNMODIFIED SERVICES INFORMATION should be considered as modified. | REL-6 |

TABLE 7-continued

| Information Element/Group name | Need | Multi | Type and reference | Semantics description | Version |
|---|---|---|---|---|---|
| >MBMS Transmission identity | MP | | MBMS Transmission identity 10.3.9a.12 | | REL-6 |
| >MBSFN inter frequency neighbour | OP | | Integer(1 ... <maxMBMS-Freq>) | Absence of this information element means the currently used frequency. Value n corresponds with the $n^{th}$ frequency included in the IE New inter-frequency cells that is specified within SIB 11 | REL-7 |

The italics in the table refer to newly amended contents with respect to the embodiment of the present invention.

The MBMS GENERAL INFORMATION is mainly used for the general configuration in the MBMS dedicated carrier cells, and the content thereof is similar to that defined in 3GPP Release6, but a carrier notification indicator is added, and when the MBSFN services notified corresponding to a certain carrier are TRUE, it represents that the service notification on this carrier will be transmitted in current cell. The specific information format is shown in table 8:

TABLE 8

| Information Element/Group name | Need | Multi | Type and reference | Semantics description | Version |
|---|---|---|---|---|---|
| Message type | MP | | Message Type | | REL-6 |
| MBMS timers and counters | MP | | MBMS specific timers and counters 10.3.9a.11 | | REL-6 |
| MICH configuration information | MP | | MICH configuration information 10.3.9a.14 | | REL-6 |
| Cell group identity | MP | | Bit string (12) | Identifies the group of cells for which the same common RLC and PDCP entity is used as the current cell | REL-6 |
| Default MSCH configuration information | OP | | MSCH configuration information 10.3.9a.16 | The default MSCH configuration | REL-6 |
| CHOICE MBSFN services notification | OP | | | | |
| >MBSFN inter frequency neighbour | OP | | Integer(1 ... <maxMBMS-Freq>) | Value n corresponds with the $n^{th}$ frequency included in the IE New inter-frequency cells that is specified within SIB 11 | REL-7 |
| >MBSFN services notified | | | Enumerated (TRUE, FALSE) | TRUE Indicates the notification of all MBSFN services in this inter-frequency cell will be notified in current frequency. | REL-7 |

The italics in the table refer to newly amended content with respect to the embodiment of the present invention.

The format of MBMS COMMON P-T-M RB INFORMATION is the same as that defined in 3GPP Release6, please refer to relevant description in protocol TS25.331 in 3GPP.

The MBMS CURRENT CELL P-T-M RB INFORMATION is mainly used for indicating the RB configured in this dedicated carrier cell and the information of relevant logic channels MTCH, MSCH, transmission channels and physical channel SCCPCH. The specific information format is shown in table 9:

TABLE 9

| Information Element/Group name | Need | Multi | Type and reference | Semantics description | Version |
|---|---|---|---|---|---|
| Message type | MP | | Message Type | Current cell PTM RB info | REL-6 |
| S-CCPCH list | OP | 1 to <maxSCCPCH> | | Absent in case MTCH are only mapped to the S-CCPCH(s) included in SIB type 5 or 5bis | REL-6 |
| >Secondary CCPCH info | MP | | MBMS Common PhyCh identity 10.3.9a.2 | Refers to a configuration in the common RB info | REL-6 |
| >TrCh information common for all TrCh | MD | | MBMS Common CCTrCh identity 10.3.9a.1 | Refers to a (TFCS) configuration in the common RB info The default value of the TFCS is specified in subclause 14.10.1 | REL-6 |
| >TrCH information list | MP | 1 to <maxFACHPCH> | | List of FACH transport channels carrying one or more MTCH and optionally one MSCH | REL-6 |
| >>TrCh information | MP | | MBMS Common TrCh identity 10.3.9a.4 | Refers to a (TFS) configuration in the common RB info | REL-6 |
| >>RB information list | OP | 1 to <maxRBperTrCh> | | The IE is absent if temporarily no RBs are mapped to this TrCh or if the TrCH only carries MSCH | REL-6 |
| >>>RB information | MP | | MBMS p-t-m RB information 10.3.9a.7a | | REL-6 |
| >>MSCH configuration information | OP | | MSCH configuration information 10.3.9a.16 | | REL-6 |

The MBMS NEIGHBOURING CELL P-T-M RB INFORMATIONMBM is mainly used for indicating the service activation and configuration in the associated MBMS dedicated carrier cells on neighboring frequencies. Compared with 3GPP Release6, the usage of this message changes. In 3GPP Release6, this message is used for transmitting the configuration of RB in neighboring cells, which is convenient for the UE conduct physical layer combining process; while in the embodiment of the present invention, the UE has no demand for the combining process at the physical layer. The content of this message is substantially the same as that of the MBMS NEIGHBOURING-ING CELL P-T-M RB INFORMATION in 3GPP Release6, but the frequency indicator (frequency neighbour) for the RB information is added. The frequency neighbour is directed to the frequency information list transmitted in the SIB11. The MBMS NEIGHBOURING CELL P-T-M RB INFORMATIONMBM indicates the configuration information of current services on other MBMS dedicated carriers, and in this way, the UE can obtain the configuration information of other dedicated carriers from the present carrier, and if the services on other dedicated carriers is wanted to be received, the UE can receive corresponding MBMS services by being synchronized with the dedicated carrier. The specific information format is shown in table 10:

| Information Element/Group name | Need | Multi | Type and reference | Semantics description | Version |
|---|---|---|---|---|---|
| Message type | MP | | Message Type | | REL-6 |
| Neighbouring cell identity | MP | | Integer (0 . . . <maxCellMeas−1>) | The intra-frequency cell id of the cell obtained from the IE 'Intra-frequency Cell Info list' in SIB 11. If the cell is operating in MBSFN only mode the UE behaviour upon reception of this IE is unspecified. | REL-6 |
| Neighbouring cell's S-CCPCH list | MP | 1 to <maxSCCPCH> | | If the cell is operating in MBSFN only mode the UE behaviour upon reception of this IE is unspecified. | REL-6 |

| Information Element/Group name | Need | Multi | Type and reference | Semantics description | Version |
|---|---|---|---|---|---|
| >Secondary CCPCH info | MP | | MBMS Common PhyCh identity 10.3.9a.2 | S-CCPCH configuration used in neighbouring cell. Refers to a configuration in the common RB info of the current cell | REL-6 |
| >Secondary CCPCH power Offset Difference | MD | | Integer (−6, −3, 3, 6) | Difference (Pn-Of) between the S-CCPCH Power offset (Pn) of the neighboring cell S-CCPCH and the S-CCPCH power offset (Of) of the serving cell that is going to be combined to this neighbour cell S-CCPCH, in dB. Default value is 0. Note 3 and 4. | REL-6 |
| >L1 combining | OP | | | L2-combining applies if the IE is absent | REL-6 |
| >>CHOICE mode | MP | | | | REL-6 |
| >>>FDD | | | | | REL-6 |
| >>>>MBMS Soft Combining Timing Offset | MP | | MBMS Soft Combining Timing Offset 10.3.9a.10a | Timing offset applied in the CFN calculation in subclause 8.5.15.5 | REL-6 |
| >>>>MBMS transmission time difference | MP | | Integer (0 . . . 3) | Indicates the time difference between the TTIs on the current and the neighbouring cell's SCCPCH that can be L1-combined | REL-6 |
| >>>>MBMS L1 combining schedule | OP | | MBMS L1 combining schedule 10.3.9a.7 | If included partial layer 1 combining applies, in which case this IE indicates when L1-combining applies. If the IE is absent, L1 combining applies continuously | REL-6 |
| >>>TDD | | | | (no data) | REL-6 |
| >CHOICE L23 configuration | MP | | | | REL-6 |
| >>SameAs Current cell | | | | Apart from the physical channel configuration and the MSCH configuration information, the same configuration as for the indicated S-CCPCH used in the current cell applies. The MSCH is mapped on the same transport channel as in the current cell. | REL-6 |
| >>>Current cell's S-CCPCH | MP | | MBMS Current cell S-CCPCH identity 10.3.9a.5 | Reference to the S-CCPCH in the current cell which uses exaclty the same configuration (excluding MSCH configuration). | REL-6 |
| >>>MSCH configuration information | OP | | MSCH configuration information 10.3.9a.16 | | REL-6 |
| >>Different | | | | | REL-6 |
| >>>TrCh information for common for all TrCh | MD | | MBMS Common CCTrCh identity 10.3.9a.1 | Refers to a (TFCS) configuration in the common RB info The default value of the TFCS is specified in subclause 14.10.1 | REL-6 |
| >>>TrCH information list | MP | 1 to <maxFACHPCH> | | List of FACH transport channels carrying one or more MTCH and optionally one MSCH | REL-6 |
| >>>>TrCh information | MP | | MBMS Common TrCh identity 10.3.9a.4 | Refers to a (TFS) configuration in the common RB info | REL-6 |

-continued

| Information Element/Group name | Need | Multi | Type and reference | Semantics description | Version |
|---|---|---|---|---|---|
| >>>>TrCh combining status | MP | | BOOLEAN | Value TRUE means that TrCh combining is used for this transport channel (TDD only). Note 2. The IE shall be ignored in FDD mode. | REL-6 |
| >>>>RB information list | OP | 1 to <maxRBperTrCh> | | The IE is only present for the radio bearers for which selection (FDD) or transport channel (TDD) combining applies. | REL-6 |
| >>>>>RB information | MP | | MBMS p-t-m RB information 10.3.9a.7a | | REL-6 |
| >>>>MSCH configuration information | OP | | MSCH configuration information 10.3.9a.16 | Included if the TrCH carries MSCH | REL-6 |
| S-CCPCH list | OP | 1 to <maxSCCPCH> | | The IE is only present for the cell operating in MBSFN only mode for 1.28 Mcps TDD. Absent in case only the MBMS services over current MBSFN cluster are notified. | REL-7 |
| >MBSFN inter frequency neighbour | OP | | Integer(1 ... <maxMBMS-Freq>) | Value n corresponds with the $n^{th}$ frequency included in the IE New inter-frequency cells that is specified within SIB 11 | REL-7 |
| >Secondary CCPCH info | MP | | MBMS Common PhyCh identity 10.3.9a.2 | Refers to a configuration in the common RB info | REL-7 |
| >TrCh information common for all TrCh | MD | | MBMS Common CCTrCh identity 10.3.9a.1 | Refers to a (TFCS) configuration in the common RB info The default value of the TFCS is specified in subclause 14.10.1 | REL-7 |
| >TrCH information list | MP | 1 to <maxFACHPCH> | | List of FACH transport channels carrying one or more MTCH and optionally one MSCH | REL-7 |
| >>TrCh information | MP | | MBMS Common TrCh identity 10.3.9a.4 | Refers to a (TFS) configuration in the common RB info | REL-7 |
| >>RB information list | OP | 1 to <maxRBperTrCh> | | The IE is absent if temporarily no RBs are mapped to this TrCh or if the TrCH only carries MSCH | REL-7 |
| >>>RB information | MP | | MBMS p-t-m RB information 10.3.9a.7a | | REL-7 |
| >>MSCH configuration information | OP | | MSCH configuration information 10.3.9a.16 | | REL-7 |

Figure 6:
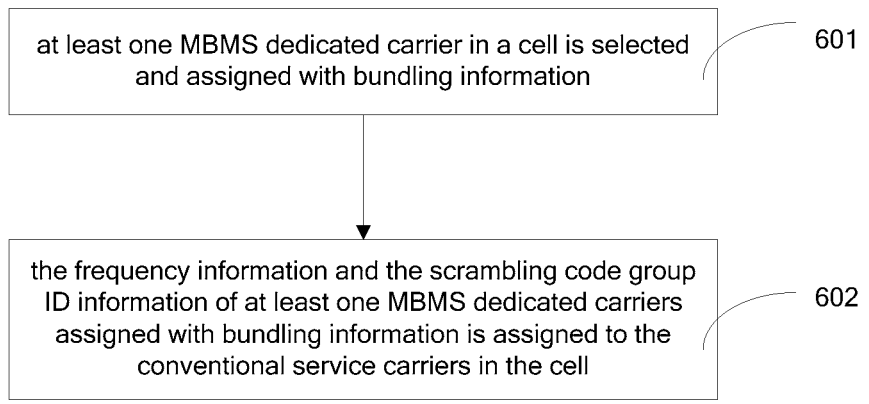
FIG. 6 illustrates a flow chart of a configuration method for the MBMS dedicated carrier frame according to an embodiment of the present invention.

FIG. 6 illustrates a flow chart of the configuration method for the MBMS dedicated carrier frame according to an embodiment of the present invention. As shown in FIG. 6, the configuration method for the MBMS dedicated carrier frame in the embodiment of the present invention includes the following steps:

Step 601, at least one of MBMS dedicated carriers in a cell is chose and MBMS control information of all MBMS dedicated carriers and MBMS system information is assigned to it.

Each cell is configured with multiple carriers, that is, one conventional service carrier and at least one MBMS dedicated carrier. In view of the available resources of the system, generally each cell is configured with 2 to 3 dedicated carriers, to ensure high bandwidth for the MBMS transmission. In the coverage area of one multi-carrier, at least one MBMS dedicated carrier is selected to configure the bundling information, such as the MBMS control information of all the MBMS dedicated carriers and the MBMS system information. The above bundling information can be assigned to one MBMS dedicated carrier or two (if there are two or more) MBMS dedicated carriers. When there are multiple MBMS dedicated carriers in current cell, they can all be assigned the bundling information. The above bundling information is assigned to the short timeslot of the MBMS dedicated carrier frame. One skilled in the art should understand that the structure of the MBMS dedicated carrier frame according to the embodiment of the present invention is considered as an illustrative example. The bundling information in the embodiment of the present invention can be assigned to other downlink timeslots. As to the specific configuration method for the bundling information, please refer to relevant description about the configuration of the MBMS dedicated carrier frame in the preceding text, which is omitted here.

Step 602, the frequency information and the corresponding scrambling code group ID information of at least one of the MBMS dedicated carriers assigned bundling information is assigned to conventional service carriers in the cell. After assigning the bundling information to the dedicated carriers in step 601, the information of at least one dedicated carrier assigned with the bundling information needs to be sent to a UE. As to the specific configuration method, please refer to relevant description about the configuration of the MBMS dedicated carrier frame in the preceding text, which is omitted here. In the embodiment of the present invention, a conventional service carrier is used to transmit the information of the dedicated carrier assigned the bundling information.

Figure 7:
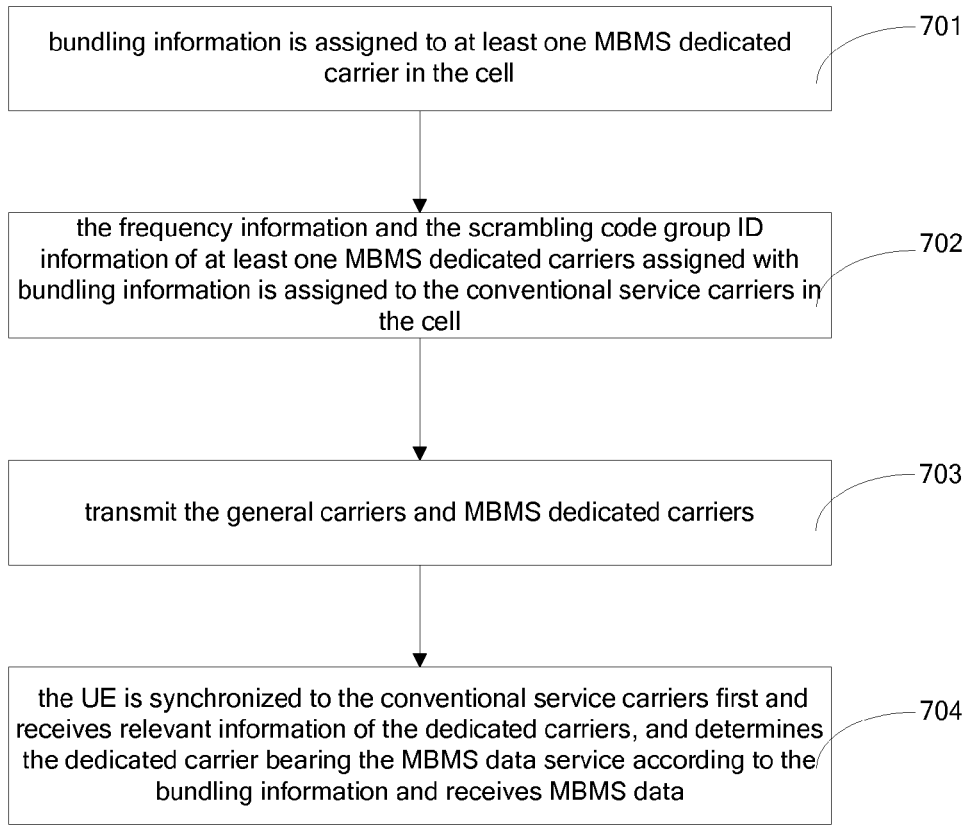
FIG. 7 illustrates a flow chart of a method for transmitting MBMS based on dedicated carriers assigned bundling information according to an embodiment of the present invention.

FIG. 7 illustrates a flow chart of the method for transmitting MBMS based on dedicated carriers assigned bundling information according to the embodiment of the present invention. As shown in FIG. 7, the method for transmitting the MBMS according to the embodiment of the present invention includes:

Step 701, at least one of MBMS dedicated carriers in a cell is chose and MBMS control information of all MBMS dedicated carriers and MBMS system information is assigned to it. As to the specific configuration method, please refer to relevant description about the configuration of the MBMS dedicated carrier frame in the preceding text, which is omitted here.

Step 702, the frequency information and the corresponding scrambling code group ID information of at least one of the MBMS dedicated carriers configured with bundling information is assigned to conventional service carriers in the cell. As to the specific configuration method, please refer to relevant description about the configuration of the MBMS dedicated carrier frame in the preceding text, which is omitted here.

Step 703, the cell transmits conventional carriers and dedicated carriers.

Step 704, the UE is synchronized to the conventional service carriers and acquires the frequency information and the scrambling code group ID information of the MBMS dedicated carriers assigned the MBMS system information and control information, and the UE is synchronized to one dedicated carrier according to the frequency information and the scrambling code group ID information of the MBMS dedicated carriers, and the UE obtains the configuration information of the MBMS services according to the MBMS control information of all the MBMS dedicated carriers and the sensed MBMS system information, and receives the MBMS data on the dedicated carriers. The above configuration information includes timeslot information, channel information, modulation method, and etc.

As for the UE being of double receivers supporting conventional services and the MBMS, before synchronized to the MBMS dedicated carrier system, the UE first should be synchronized to a conventional carrier associated with the MBMS dedicated carrier system, and then is synchronized quickly to the MBMS dedicated carrier system according to the MBSFN cell parameter ID of the MBMS dedicated carrier system indicated on the conventional carriers. In the embodiment of the present invention, when there are multiple MBMS dedicated carriers assigned the bundling information, any one of them can be selected for sensing.

After synchronized to the MBMS dedicated carrier system, the UE first decodes the PCCPCH physical channel, reads the content in the BCCH, and checks whether the carrier is the MBMS dedicated carrier system using the MB SFN only indicator in the SIB3; then the UE decides how to sense the MCCH channel using the frequency band indicator in the SIB5 and the SCCPCH physical channel corresponding to the MCCH.

The UE obtain the selectable services of the cell by receiving the service indicator on the MCCH, and can also obtain the service activation of the MBMS dedicated carrier cells on neighboring frequencies. The UE can determine whether the cell is able to inform the service activation of the MBMS dedicated carrier cells of neighboring frequencies, according to the MBSFN services notified in the MBMS GENERAL INFORMATION.

If the UE found no interesting service, it senses the MCCH in the DRX mode; if the services the UE interested are within the current cell, it directly receives relevant services according to the RB configuration and channel parameters for the services in the MBMS CURRENT CELL P-T-M RB INFORMATION, and after receiving the services, the UE may select the DRX mode to sense suitable MCCH, so as to understand the activation of the MBMS services.

If the services the UE interested are within the MBMS dedicated carrier cells on neighboring frequencies, the UE directly receives relevant services according to the RB configuration and channel parameters for the services in the MBMS NEIGHBOURING CELL P-T-M RB INFORMATIONMBMS, and after receiving the services, the UE may select the DRX mode to sense suitable MCCH, so as to understand the activation of the MBMS services. Which MCCH to be sensed depends on the configuration of the MBMS services by the UE and which service notified by the MBMS dedicated carrier cell is mostly associated with the UE.

In the embodiment of the present invention, the UE adopts the discontinuous reception DRX mode to sense the carriers. To know about the MBMS transmissions on the dedicated carriers, the UE needs to periodically sense the control signaling of the MCCH on a bearer carrier assigned the bundling information. The UE can sense the MBMS MODIFIED SERVICES INFORMATION transmitted by the MCCH on the carriers during each Modification period, to decide whether it is necessary to continue reading the MCCH during the subsequent time of the Modification period. A mechanism similar to that in 3GPP Release6 can be adopted for the DRX mode.

Figure 8:
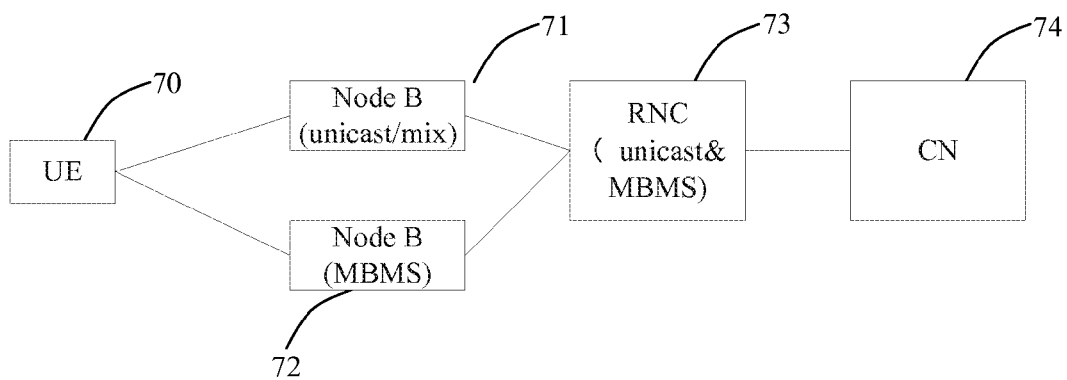
FIG. 8 illustrates a structure of a system for transmitting MBMS corresponding to the method for transmitting MBMS according to an embodiment of the present invention.

FIG. 8 illustrates a structure of the system for transmitting MBMS corresponding to the method for transmitting MBMS according to the embodiment of the present invention. As shown in FIG. 8, the system for transmitting multimedia broadcast multicast services according to the embodiment of the present invention includes: a core network CN 74, a Node B 71 for conventional services, a Node B 72 for the MBMS, a Node B for controlling the conventional services, a radio network controller RNC 73 of the MBMS Node B, and a user equipment UE 70. The RNC 73 is connected with the CN 74 via interface Iu, the conventional service Node B and the MBMS Node B 72 are connected with the RNC 73 via interface Iub, and the UE 70 is connected with the conventional service Node B 71 and the MBMS Node B 72 respectively via interface Uu.

Figure 9:
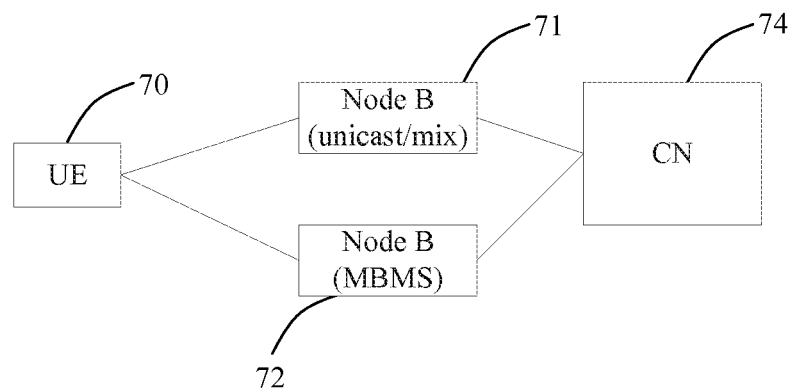
FIG. 9 illustrates another structure of a system for transmitting MBMS corresponding to the method for transmitting MBMS according to an embodiment of the present invention.

FIG. 9 illustrates another structure of the system for transmitting MBMS corresponding to the method for transmitting MBMS according to the embodiment of the present invention. As shown in FIG. 9, the system for transmitting multimedia broadcast multicast services according to the embodiment of the present invention includes a core network CN 74, a Node B 71 for conventional services, a MBMS dedicated Node B 72 and a user equipment UE 70. Compared with the structure shown in FIG. 8, the structure shown in FIG. 9 does not include the RNC. With the development and evolution of 3G networks, the functions of the Node B become stronger and stronger, and the functions of the RNC are transformed into the Node B. The structure shown in FIG. 9 will in favor of realizing the MBMS service networking.

The description above is just a preferred embodiment of the present invention, and is not intended to restrict the scope of protection of the present invention.

What is claimed is:

1. A Multimedia Broadcast Multicast Service (MBMS) dedicated carrier configuration method, comprising:
   assigning MBMS dedicated carrier bundling information to a downlink timeslot of a radio frame of one MBMS dedicated carrier in a cell; and
   combining a downlink pilot timeslot, an uplink pilot timeslot, and a chip guard period between the downlink and the uplink in the MBMS dedicated carrier frame as a short timeslot corresponding to the downlink timeslot used to control information transmission, wherein the dedicated carrier bundling information includes MBMS system information and MBMS control information of all dedicated carriers that are bundled to transmit MBMS services in the cell, wherein the downlink timeslot, assigned the MBMS system information and the MBMS control information of all dedicated carriers that are bundled to transmit MBMS services in the cell, comprises a MBMS broadcast control channel BCCH and a MBMS point-to-multipoint control channel MCCH, wherein the MBMS system information is carried on the BCCH and mapped to a primary common control physical channel PCCPCH via a broadcast channel BCH and the MBMS control information is carried on the MCCH and mapped to a secondary common control physical channel SCCPCH via a forward access channel FACH.

2. The MBMS dedicated carrier configuration method according to claim 1, wherein the MBMS system information and the MBMS control information of all dedicated carriers that are bundled to transmit MBMS services in the cell are assigned to one downlink timeslot of the radio frame of the MBMS dedicated carrier.

3. The MBMS dedicated carrier configuration method according to claim 2, wherein the downlink timeslot, assigned the MBMS system information and the MBMS control information of all dedicated carriers that are bundled to transmit MBMS services in the cell, comprises one or more of a MBMS point-to-multipoint scheduling channel MSCH, a MBMS notification indicator channel MICH, a MBMS point-to-multipoint service channel MTCH and a conventional service paging channel.

4. The MBMS dedicated carrier configuration method according to claim 1, wherein the PCCPCH is located at a fixed position of the downlink timeslot, and the fixed position information is set in respective MBMS mobile terminals.

5. The MBMS dedicated carrier configuration method according to claim 1, wherein the downlink timeslot, assigned the MBMS system information and the MBMS control information of all dedicated carriers that are bundled to transmit MBMS services in the cell, is assigned MBMS service notification information or program guidance information, and the downlink timeslot is mapped to the secondary common control physical channel SCCPCH via a MBMS point-to-multipoint service channel MTCH.

6. The MBMS dedicated carrier configuration method according to claim 1, further comprising:
   assigning frequency information and scrambling code group ID information of at least one of the MBMS dedicated carriers, assigned the MBMS system information and the MBMS control information of all dedicated carriers that are bundled to transmit MBMS services in the cell to the conventional service carriers in the cell.

7. The MBMS dedicated carrier configuration method according to claim 1, wherein the MBMS system information is transmitted by system information blocks SIB.

8. The MBMS dedicated carrier configuration method according to claim 7, wherein the system information blocks carrying the MBMS system information include at least a SIB5 and a master information block.

9. The MBMS dedicated carrier configuration method according to claim 1, wherein the MBMS control information includes MBMS modified services information, MBMS unmodified services information, MBMS general information, MBMS common point-to-multipoint radio bearer information, MBMS current cell point-to-multipoint radio bearer information, and MBMS neighboring cell point-to-multipoint radio bearer information.

10. A Multimedia Broadcast Multicast Service (MBMS) dedicated carrier configuration base station comprising a processor and a memory storing instructions that, when executed by the processor, cause the processor to perform operations comprising:
    assigning MBMS system information and MBMS control information of all MBMS dedicated carriers that are bundled to transmit MBMS services in a cell to one MBMS dedicated carrier in the cell; and
    assigning frequency information and scrambling code group ID information of the MBMS dedicated carrier, assigned the MBMS system information and the MBMS control information of all MBMS dedicated carriers that are bundled to transmit MBMS services in the cell, to conventional service carriers in the cell; and
    combining a downlink pilot timeslot, an uplink pilot timeslot, and a chip guard period between the downlink and the uplink in the MBMS dedicated carrier frame as a short timeslot used to control information transmission, wherein the short timeslot, assigned the MBMS system information and the MBMS control information of all dedicated carriers that are bundled to transmit MBMS services in the cell, comprises a MBMS broadcast control channel BCCH and a MBMS point-to-multipoint control channel MCCH, and the MBMS system information is carried on the BCCH and mapped to a primary common control physical channel PCCPCH via a broadcast channel BCH, wherein the MBMS control information is carried on the MCCH and mapped to a secondary common control physical channel SCCPCH via a forward access channel FACH.

11. The MBMS dedicated carrier configuration base station according to claim 10, wherein the MBMS system information and the MBMS control information of all dedicated carriers and that are bundled to transmit MBMS services in the cell are assigned to one downlink timeslot of the radio frame of a MBMS dedicated carrier.

12. The MBMS dedicated carrier configuration base station according to claim 10, wherein the PCCPCH is located at a fixed position of the downlink timeslot, and the fixed position information is set in respective MBMS mobile terminals.

13. The MBMS dedicated carrier configuration base station according to claim 10, wherein the MBMS system information is transmitted by system information blocks SIB.

14. The MBMS dedicated carrier configuration base station according claim 10, wherein the MBMS control information includes MBMS modified services information, MBMS unmodified services information, MBMS general information, MBMS common point-to-multipoint radio bearer information, MBMS current cell point-to-multipoint radio bearer information, and MBMS neighboring cell point-to-multipoint radio bearer information.

15. A Multimedia Broadcast Multicast Service (MBMS) transmission method based on dedicated carriers assigned bundling information, comprising:
    assigning MBMS system information and MBMS control information of all MBMS dedicated carriers that are bundled to transmit MBMS services in a cell to one MBMS dedicated carrier in the cell;
    assigning frequency information and scrambling code group ID information of the MBMS dedicated carrier, assigned the MBMS system information and the MBMS control information of all dedicated carriers that are bundled to transmit MBMS services in the cell, to conventional service carriers in the cell;
    combining a downlink pilot timeslot, an uplink pilot timeslot, and a chip guard period between the downlink and the uplink in the MBMS dedicated carrier frame as a short timeslot used to control information transmission, wherein the short timeslot, assigned the MBMS system information and the MBMS control information of all dedicated carriers that are bundled to transmit MBMS services in the cell, comprises a MBMS broadcast control channel BCCH and a MBMS point-to-multipoint control channel MCCH, wherein the MBMS system information is carried on the BCCH and mapped to a primary common control physical channel PCCPCH via a broadcast channel BCH and the MBMS control information is carried on the MCCH and mapped to a secondary common control physical channel SCCPCH via a forward access channel FACH; and
    sending MBMS data.

16. The MBMS transmission method based on dedicated carriers assigned with bundling information according to claim 15, further comprising:
    a UE being synchronized to the conventional service carriers and acquiring the frequency information and the scrambling code group ID information of the MBMS dedicated carriers assigned the MBMS system information and control information, and the UE being synchronized to one dedicated carrier according to the time synchronization information of the conventional service carriers, the frequency information and the scrambling code group ID information of the MBMS dedicated carriers, the UE sensing the MBMS control information of the MBMS dedicated carriers and the MBMS system information to obtain the configuration information of the MBMS services, and receiving the MBMS data on the dedicated carrier.

17. The MBMS transmission method based on dedicated carriers configured with bundling information according to claim 16, wherein the UE senses the carriers in a discontinuous reception DRX manner.

\* \* \* \* \*